United States Patent

Ikeshoji et al.

[11] Patent Number: 5,943,045
[45] Date of Patent: Aug. 24, 1999

[54] IMAGE FILE, GENERATION METHOD THEREOF, AND IMAGE DISPLAY APPARATUS

[75] Inventors: Nobuo Ikeshoji; Tatsuya Yamamoto, both of Yokohama; Toshiro Kamiuchi, Tokyo; Nagaharu Hamada, Hitachi; Koichi Honda; Hiromi Yamakawa, both of Fujisawa, all of Japan

[73] Assignee: Hitachi, Ltd., Tokyo, Japan

[21] Appl. No.: 08/920,013

[22] Filed: Aug. 26, 1997

Related U.S. Application Data

[62] Division of application No. 08/498,322, Jul. 5, 1995.

[30] Foreign Application Priority Data

Jul. 7, 1994 [JP] Japan ................................. 6-155775

[51] Int. Cl.$^6$ ....................................... G09G 5/06
[52] U.S. Cl. ............................................ 345/199; 348/672
[58] Field of Search ..................................... 345/150, 153, 345/199, 202; 358/501, 448, 445, 458; 348/672, 674, 675

[56] References Cited

U.S. PATENT DOCUMENTS

| | | | |
|---|---|---|---|
| 5,241,386 | 8/1993 | Tsuji et al. ............................... | 358/458 |
| 5,294,986 | 3/1994 | Tsuji et al. ............................... | 348/672 |
| 5,315,389 | 5/1994 | Izawa et al. ............................. | 348/672 |

*Primary Examiner*—Regina Liang
*Attorney, Agent, or Firm*—Frohwitter

[57] ABSTRACT

An image file for recording natural images, a generation method of the image file and an image display apparatus for displaying image data from this image file. The image file includes image data obtained by digitizing an original, and conversion tables for separating the color tones of the original into R, G and B and converting the changes of the color tones to input luminance-v-output luminance. The image display apparatus controls a color look-up table by the conversion tables read out from the image file, and displays the image data read out from the image file. The generation method of the image file includes reading development data by reading the first original by a scanner, generating a histogram between luminance and appearance frequency for each of R, G and B, integrating the appearance frequency to obtain a first cumulative histogram, generating similarly the second cumulative histogram for each of R, G and B of the final original to obtain conversion tables for the second histogram with the first cumulative histogram being the reference, and continuously displaying the color tones of a still image by using the image data and the conversion tables of the first original.

2 Claims, 10 Drawing Sheets

(a) HISTOGRAM (b) CUMULATIVE HISTOGRAM

FIG.5

(a) HISTOGRAM (b) CUMULATIVE HISTOGRAM

| INPUT LUMINANCE LEVEL | OUTPUT LUMINANCE LEVEL |
|---|---|
| 0 | . |
| 1 | . |
| 2 | . |
| . | . |
| $n_G$ | $m_{G1} \sim m_{G2}$ |
| . | . |
| 253 | . |
| 254 | . |
| 255 | . |

662

B

| INPUT LUMINANCE LEVEL | OUTPUT LUMINANCE LEVEL |
|---|---|
| 0 | . |
| 1 | . |
| 2 | . |
| . | . |
| $n_B$ | $m_{B1} \sim m_{B2}$ |
| . | . |
| 253 | . |
| 254 | . |
| 255 | . |

663

R

| INPUT LUMINANCE LEVEL | OUTPUT LUMINANCE LEVEL |
|---|---|
| 0 | . |
| 1 | . |
| 2 | . |
| . | . |
| $n_R$ | $m_{R1} \sim m_{R2}$ |
| . | . |
| 253 | . |
| 254 | . |
| 255 | . |

IMAGE FILE, GENERATION METHOD THEREOF, AND IMAGE DISPLAY APPARATUS

The present application is a divisional of parent application Ser. No. 08/498,322 filed Jul. 5, 1995, still pending.

BACKGROUND OF THE INVENTION

This invention relates to an image file suitable for recording natural images such as photographs, illustrations, pictures, etc, handled in art museums, museums, broadcasting stations, publication companies, video productions, photographic studios, public agencies and PR departments of companies in general, a generation method of the image file, and an image display apparatus for displaying image data from the image file.

An apparatus which records natural images such as photographs, pictures, etc, in an image file, reads out the images from the image file, whenever necessary, and displays still images is known.

In such an image display apparatus, it is often required to change and process the overall color tones with the passage of time on the basis of a certain still image. Such a processing is referred to as "color-morphing". This color-morphing can be accomplished, in principle, by a method which generates image data having varied color tones for a large number of screens and records them is an image file. However, this method calls for a great deal of time and labor for generating the image data for a large number of screens, and the image data greatly occupy the recording regions of the image file.

The image data is obtained by reading a photograph as an original by a scanner and is displayed on the image display apparatus after image processing. In this case, the positions of the originals with respect to the scanner are likely to deviate when a plurality of originals are read by the scanner, and there occurs the problem that the image displayed fluctuates delicately.

SUMMARY OF THE INVENTION

It is a main object of the present invention to provide a processing method of image data which solves the problems described above and generates image data, an image file generated by this processing method, and an image display apparatus efficiently reading the image data from this image file and displaying them.

It is another object of the present invention to quickly display high quality full-color images in match with performance of an image display apparatus capable of high speed processing.

The image file according to the present invention includes, as fundamental means, image data obtained by digitizing originals and conversion tables for separating color tones of the originals into red (R), green (G) and blue (B) and converting the changes of the color tones to values of input luminance-v-output luminance.

The image display apparatus according to the present invention includes image display means, image memory means and a color look-up table, wherein the color look-up table is controlled by the conversion table read out from the image file and the image data read out from the image file are displayed by the image display means.

The generation method of the image file according to the present invention comprises, as fundamental process steps, a step of preparing a first original corresponding to an initial state of an image to be displayed and a second original corresponding to the final state of the image to be displayed, a step of reading the first original by a scanner and generating first image data, a step of separating the first image data into R, G and B and generating a first histogram representing the relation between a luminance level and appearance frequency of each luminance level, a step of integrating the appearance frequency of the first histogram and generating a first cumulative histogram, a step of generating second image data by reading a second original by the scanner, a step of separating the second image data into R, G and B and generating a second histogram representing the relation between a luminance level and appearance frequency of each luminance level, a step of integrating the appearance frequency of the second histogram and generating conversion table for obtaining the second histogram on the basis of the first histogram, and a step of generating compressed image data from the first image data, wherein the image data and the conversion tables generated by the steps described above are stored in the image file.

When the image file described above are used as the input data and are displayed by the image display apparatus having the color look-up table, the color look-up table is controlled by the conversion table read out from the image file, and color-morphing for changing the color tones of the still images with the passage of time can be easily executed on the display.

BRIEF DESCRIPTION OF THE DRAWINGS

Preferred embodiments of the present invention will now be described in detail with reference of the accompanying drawings, in which.

DESCRIPTION OF THE PREFERRED EMBODIMENTS

Preferred embodiments of the present invention will now be explained with reference to FIGS. 1 to 14A, 14B and 14C.

Figure 1:
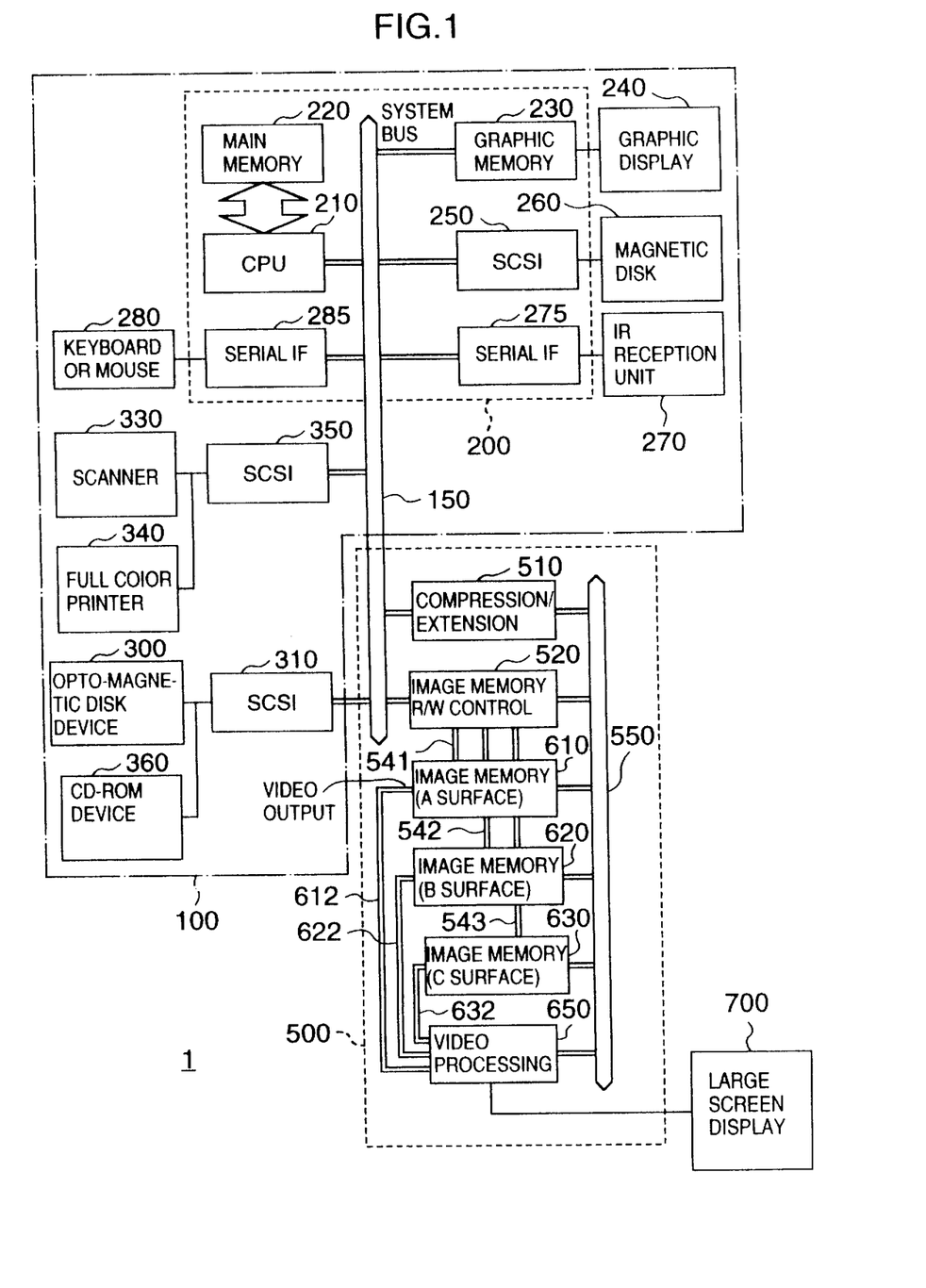
FIG. 1 is a block diagram showing the construction of an image display apparatus according to the present invention.

FIG. 1 is an explanatory view showing a system construction of an image display apparatus according to an embodiment of the present invention. The image display apparatus according to the present invention, which is represented as a whole by reference numeral 1, comprises a personal computer system 100 and an image processing unit 500, and displays an image on a large screen display 700. High precision displays having resolution of 1,280×1,024 dots, 1,600×1,200 dots and 1,920×1,035 dots are available as the large screen display 700, but this embodiment obtains high precision full-color images devoid of flickers by effecting non-interlace 72 times/sec for display images having resolution of 1,280×1,024 dots. Incidentally, this large screen display 700 may be not only a direct vision type display but also an interlace type provided that the occurrence of flickers is permitted.

Next, the construction of the personal computer system 100 shown in FIG. 1 will be explained.

The personal computer system 100 includes a personal computer 200 functioning as a central processing unit, and is wired as a whole by a system bus 150 which is a standard input/output bus of a computer. The personal computer 200, interfaces 310 and 350 and an image processing unit 500 are mounted into the same casing.

The personal computer 200 includes a CPU 210 and a main memory 220, and the CPU 210 is connected to the system bus 150. A graphic memory 230 connected to the system bus 150 stores graphic data and transfers graphic data to a graphic display 240 (a 17-in. display, for example) connected to the graphic memory 230 through a D/A convertor, not shown. The graphic data are displayed by the graphic display 240.

A magnetic disk 260 is connected to the system bus 150 through an input/output interface 250.

A keyboard or a mouse 280 is used as input means, and this input means is connected to the system bus 150 through an interface 285. The display apparatus includes further an IR (infrared ray) reception unit 270 for receiving signals from a remote control unit, not shown, and this unit 270 is connected to the system bus 150 through an interface 275.

An opto-magnetic disk device 300 supplies image data of a still image or animation recorded on an opto-magnetic disk to the system bus 150 through an interface 310.

When the still image data recorded on the opto-magnetic disk are displayed on the large screen display 700, narration, musics, etc, synchronized with the screen are outputted so as to improve a presentation effect. These sound data are prepared by a CD-ROM and are reproduced by a CD-ROM device 360. The CD-ROM device 360 is connected to, and controlled by, the system bus 150 through the interface 310. The sound data so reproduced are sent to an amplifier, not shown, and are outputted from a speaker, not shown, either.

A scanner 330, which is connected to the system bus 150 through an interface 350, has resolution of 400 DPI, for example, and is used when the image data are inputted from the later-appearing original. A full-color printer 340 prints the still image in full colors (16,770,000 colors).

When the images stored in image memories 610, 620, 630 and displayed on the large screen display 700 are printed, for example, the data from the image memories 610, 620, 630 are sent to the main memory 220 through an image bus 550, image memory read/write control means 520 and the system bus 150. Since the image data sent to the main memory 220 are data which are separated into R, G and B, they are converted to Y, M, C and K (Yellow, Magenta, Cyan, Black) for printing and are sent to the full-color printer 340 through the system bus 150 and an SCSI 350. The printer 340 then executes printing.

Next, the process ranging from the original till recording of the image data by the opto-magnetic disk will be explained with reference to FIGS. 2 to 10.

Figure 3:
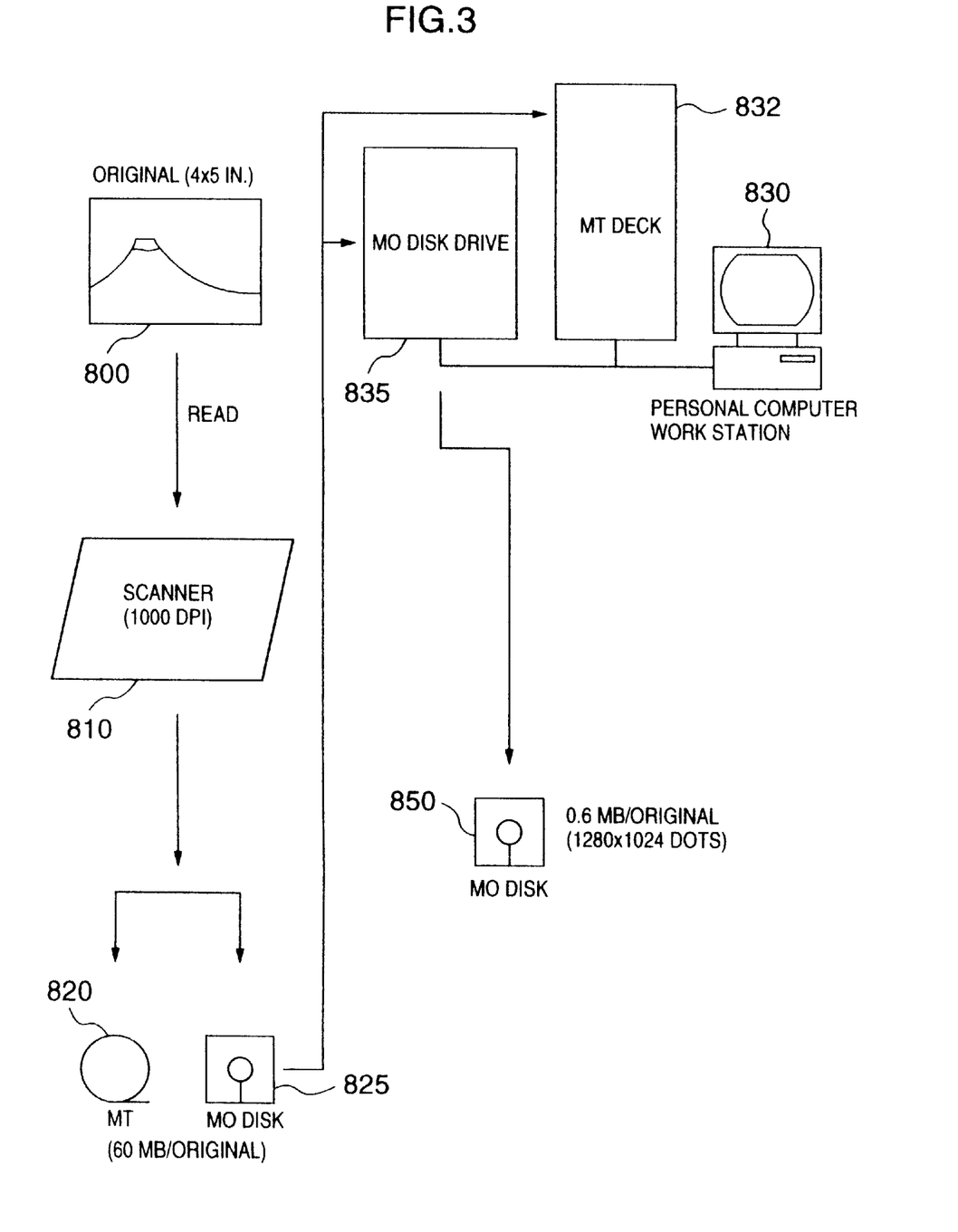
FIG. 3 is an explanatory view showing processing steps of an original for explaining the present invention.

FIG. 3 is an explanatory view showing the generation process of the image display data recorded on the opto-magnetic disk.

First, an original 800 as the raw material is prepared in the form of a positive film having a size of 4×5 in., for example. Next, this original 800 is inputted by a scanner 810 having high resolution and is recorded on a magnetic tape 820 or an opto-magnetic disk 825. A scanner having resolution of 1,000 DPI, for example, is used as the scanner 810. Primary data of the image digitized in a capacity of 60 MB (megabyte)/original, for example, is recorded on the magnetic tape 820 or the opto-magnetic disk 825.

Next, the magnetic tape 820 or the opto-magnetic disk 825 having the primary data of the image recorded thereon is mounted to the magnetic tape deck 832 or the opto-magnetic disk drive 835 of the personal computer or the work station 830, and processing of the primary data is executed.

Various processing softwares can be used for processing the primary data in accordance with the objects of image display such as the improvement of image quality, color-morphing, etc, as typified by profile highlighting of the image, color correction, removal of contamination and stains on the original, and so forth.

After the processing described above is executed, the secondary data of the image are recorded in the opto-magnetic disk 850. In the case of a display screen of 1,280×1,024 dots, for example, the secondary data of the image are recorded in a capacity of 0.6 MB/original, and are compressed to $\frac{1}{100}$ in comparison with the primary data.

Figure 10:
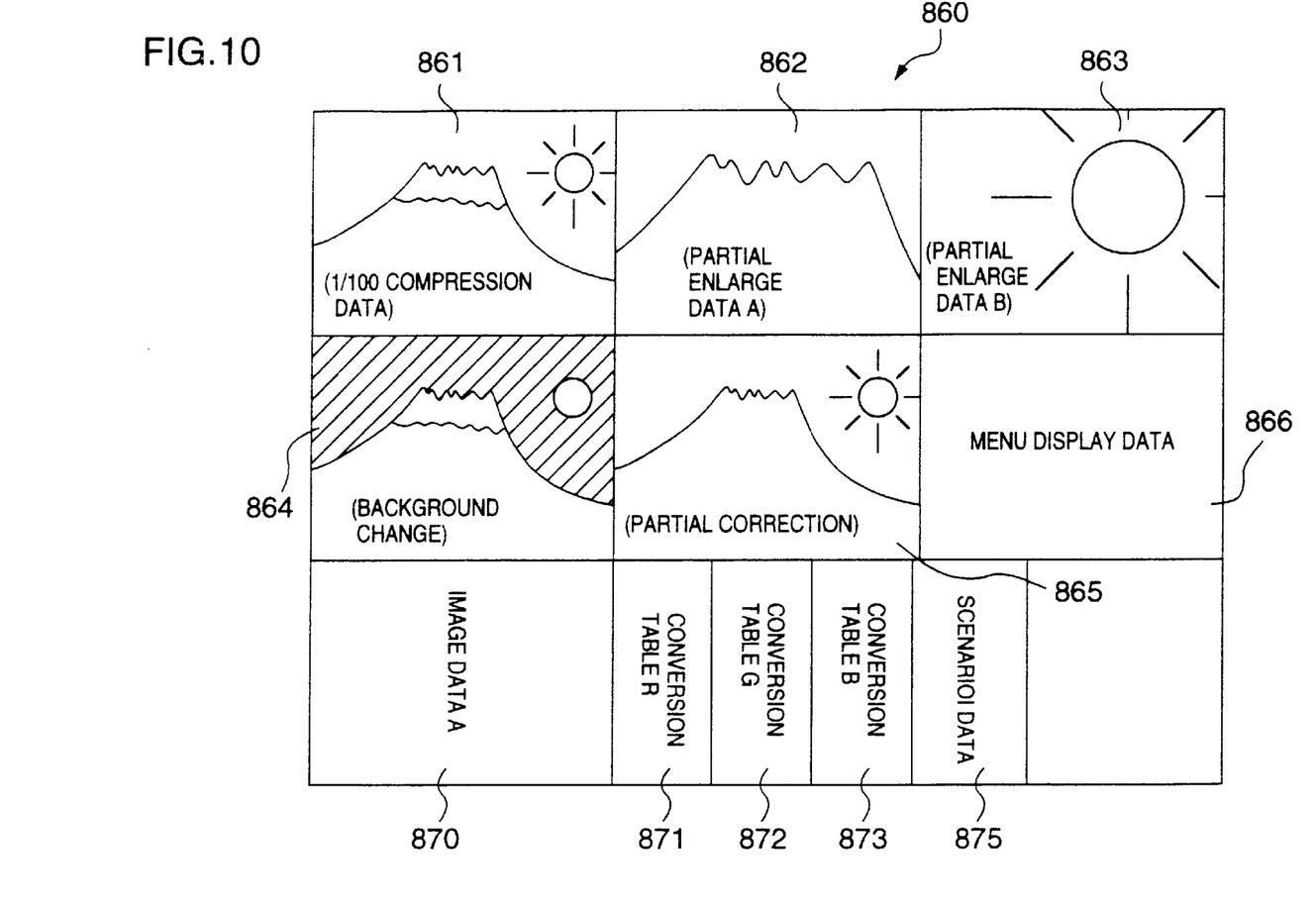
FIG. 10 is an explanatory view of an image file.

FIG. 10 is an explanatory view showing the data contents of an image file recorded in the opto-magnetic disk 850.

Several data obtained by processing the primary data of the original 800 are recorded in the image file 860. First image data 861 are those which are obtained by compressing the primary data of the original to $\frac{1}{100}$, second data 862 are partial enlarged data (A) which are obtained by enlarging part of the original, and third data 863 are partial enlarged data (B) obtained by enlarging other portions of the original. Fourth image data 864 are those which are obtained by changing the background colors of the original and fifth image data 865 are those which are obtained by partially correcting the original.

The fifth image data, which are menu display data 866, displays the screen by which an operator can select which data of the image file. Image data A 870 and conversion tables 871, 872 and 873 for R, G and B, respectively, are data for the later-appearing color-morphing processing, and scenario data 875 stores scenarios such as an image display timing.

The first image data, data 864 obtained by changing the background of the first image data 861, and the partial enlarged data 862, 863 are sent to other image memories 610, 620, 630, for example, and are used as presentation means such as wipe display, desolve display, etc.

Means for generating color-morphing data (method of continuously changing color tones of the image) of the still image will be explained with reference to FIGS. 2 and 4 to 10.

Figure 2:
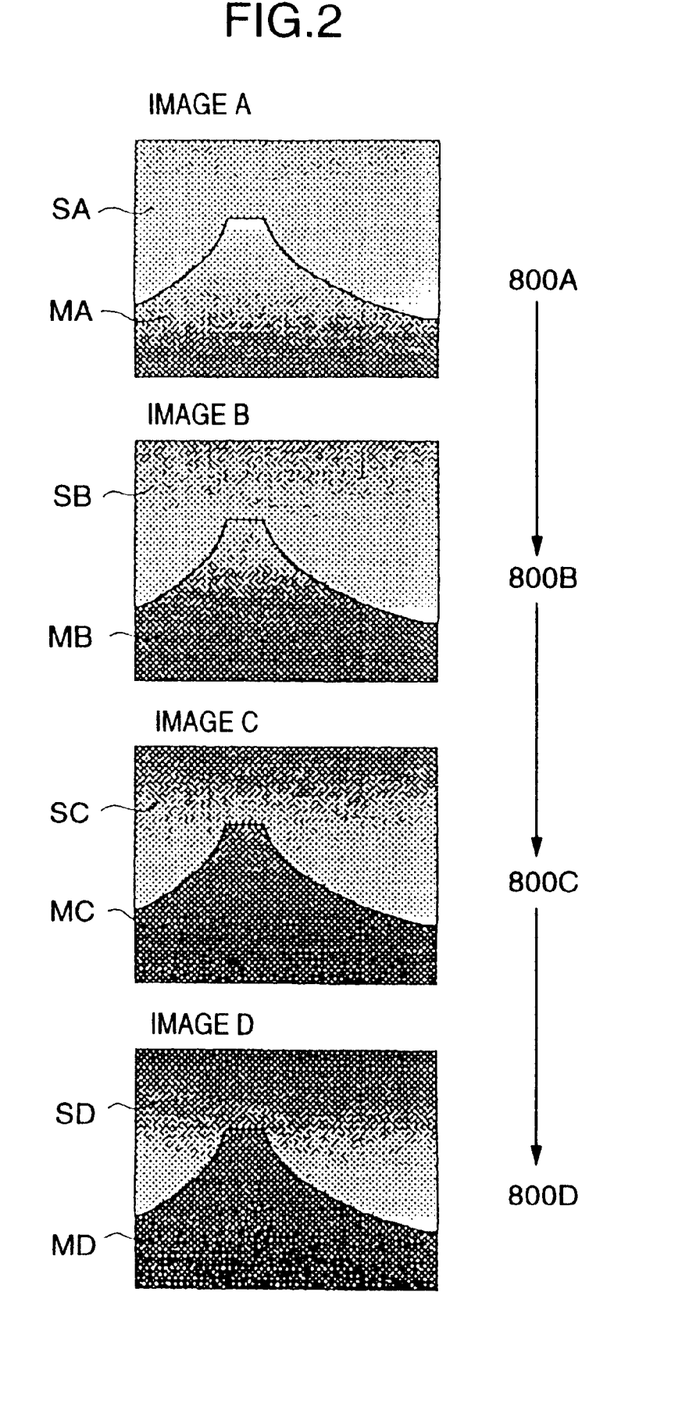
FIG. 2 is an explanatory view showing the state of an original displayed in the present invention.

FIG. 2 shows, for example, the resolved images by continuously changing the color tones of the same image (the image of a mountain) from the daytime to the evening. The drawings illustrate the resolved images when the image is changed in four stages from the image A to the image D. The images A to D illustrate the still images of the mountain, but the color tone MA of the mountain of the image A and the color tone SA of its background change to MB, MC, MD and SB, SC, SD, respectively, as the image A shifts to the images B, C and D.

In this case, the first original 800A (not shown) shooting the first scene and the second screen 800D (not shown) shooting the final scene are first prepared.

Figure 4:
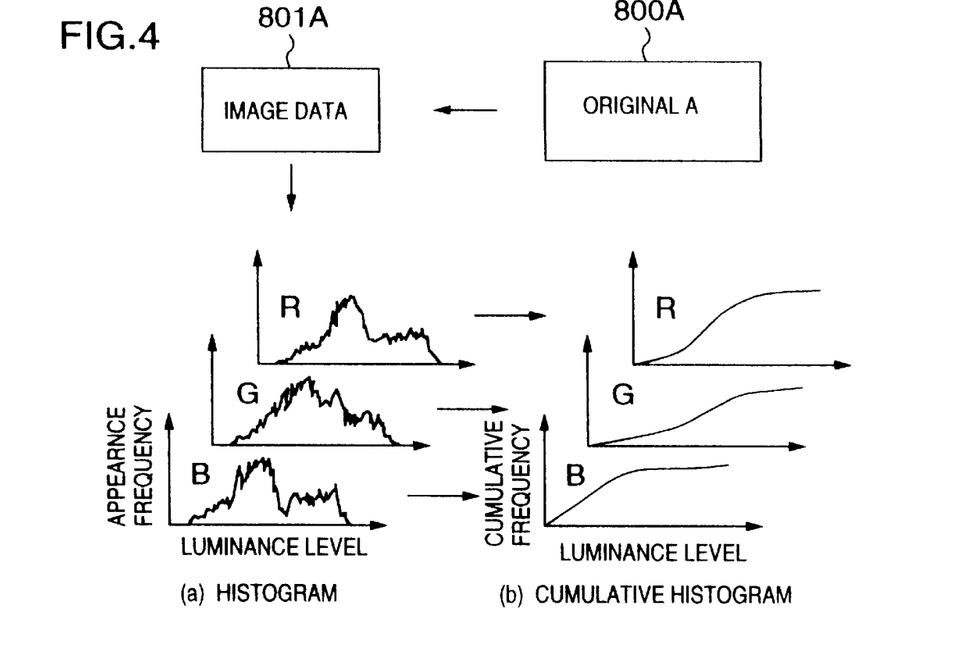
FIG. 4 is an explanatory view showing means for generating a cumulative histogram from image data obtained by reading originals.

FIG. 4 shows the process step of reading this first original 800A by a scanner 810 and generating the image data 801A. Next, this image data 801A is separated into the three primary colors R, G and B signals. A histogram is then worked out for each of R, G and B by plotting a luminance level of the image on the abscissa and appearance frequency on the ordinate.

Next, a cumulative histogram having the luminance level plotted on the abscissa and the cumulative frequency on the ordinate is obtained for each of R, G and B by integrating the appearance frequency of the histogram described above.

Figure 5:
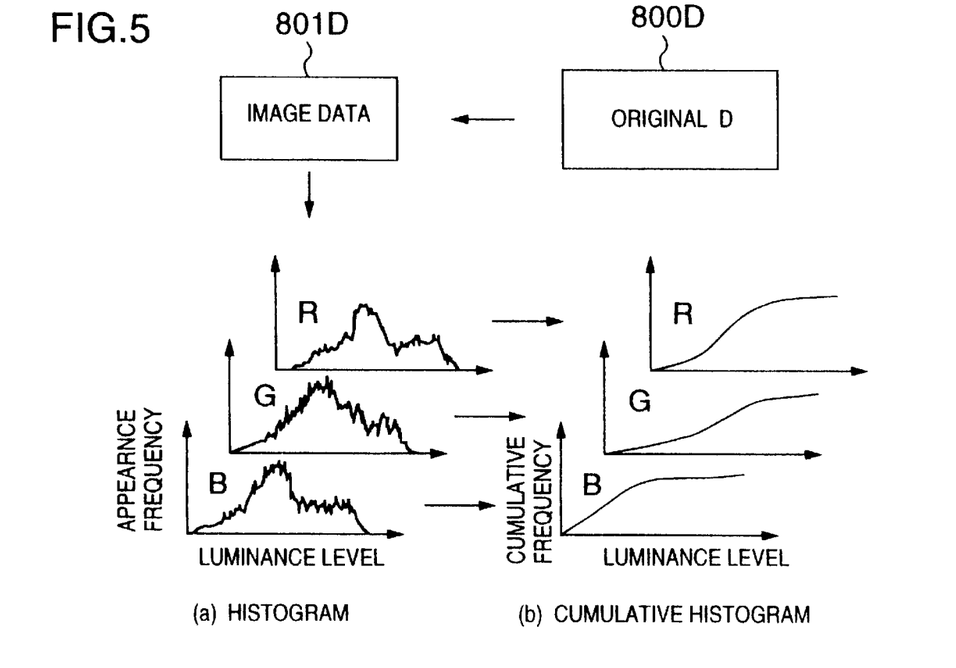
FIG. 5 is an explanatory view showing means for generating a cumulative histogram from image data obtained by reading the originals.

As shown in FIG. 5, the second original 800D, too, is processed in the same way as the first original 800A, and a cumulative histogram is obtained for each of R, G and B.

Next, conversion tables for generating the image data of the second original are created on the basis of the image data of the first original by using the cumulative histograms of the first and second originals.

The processing using the R signal will be explained by way of example.

Fundamental means for processing brings the curve of the cumulative histogram of R of the image data of the first original close to the curve of the cumulative histogram of R of the image data of the second original. The color tones till the color tones of the second original can be reproduced finally by using the color tone of the first original as the start by the R output on the basis of the curve obtained in the course of this processing (in practice, G and B are simultaneously processed).

Figure 6:
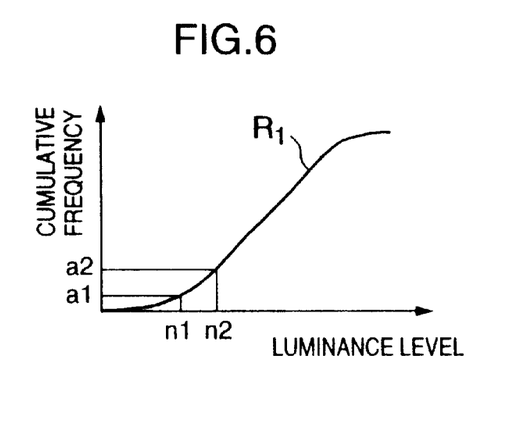
FIG. 6 is an explanatory view showing means for generating a conversion table used for color-morphing.
Figure 7:
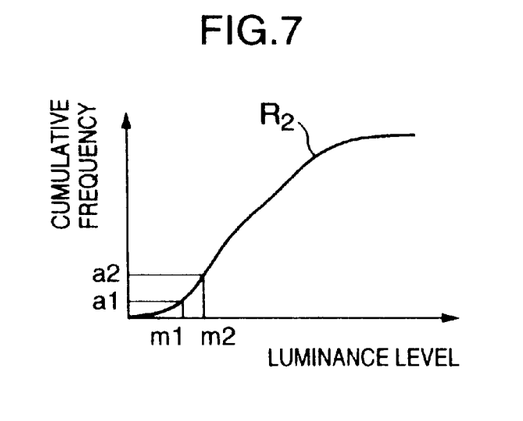
FIG. 7 is an explanatory view showing means for generating a conversion table used for color-morphing.

FIG. 6 shows the curve $R_1$ of the cumulative histogram of R of the first original and FIG. 7 shows the curve $R_2$ of the cumulative histogram of R of the second original.

First, the luminance levels $n_1, n_2, \ldots$ corresponding to the cumulative frequencies $a_1, a_2, \ldots$ in the curve $R_1$ and the luminance levels $m_1, m_2, \ldots$ corresponding to the cumulative frequencies $a_1, a_2, \ldots$ in the curve $R_2$ are determined.

Figure 8:
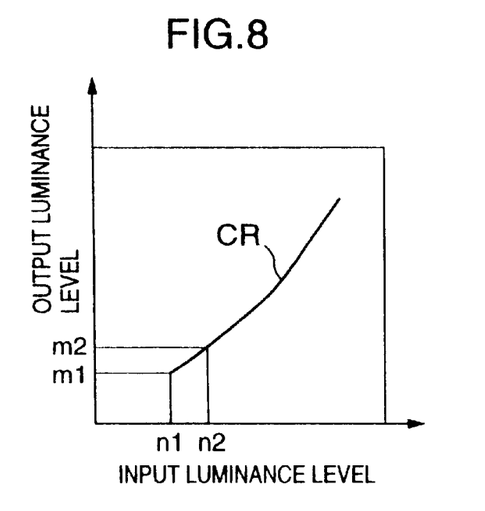
FIG. 8 is an explanatory view showing means for generating a conversion table used for color-morphing.

Next, a curve CR is obtained by plotting the luminance levels $n_1, n_2, \ldots$ on the abscissa and the luminance levels $m_1, m_2, \ldots$ on the ordinate as shown in FIG. 8. This FIG. 8 is a conversion table for the image data R.

Figure 9:
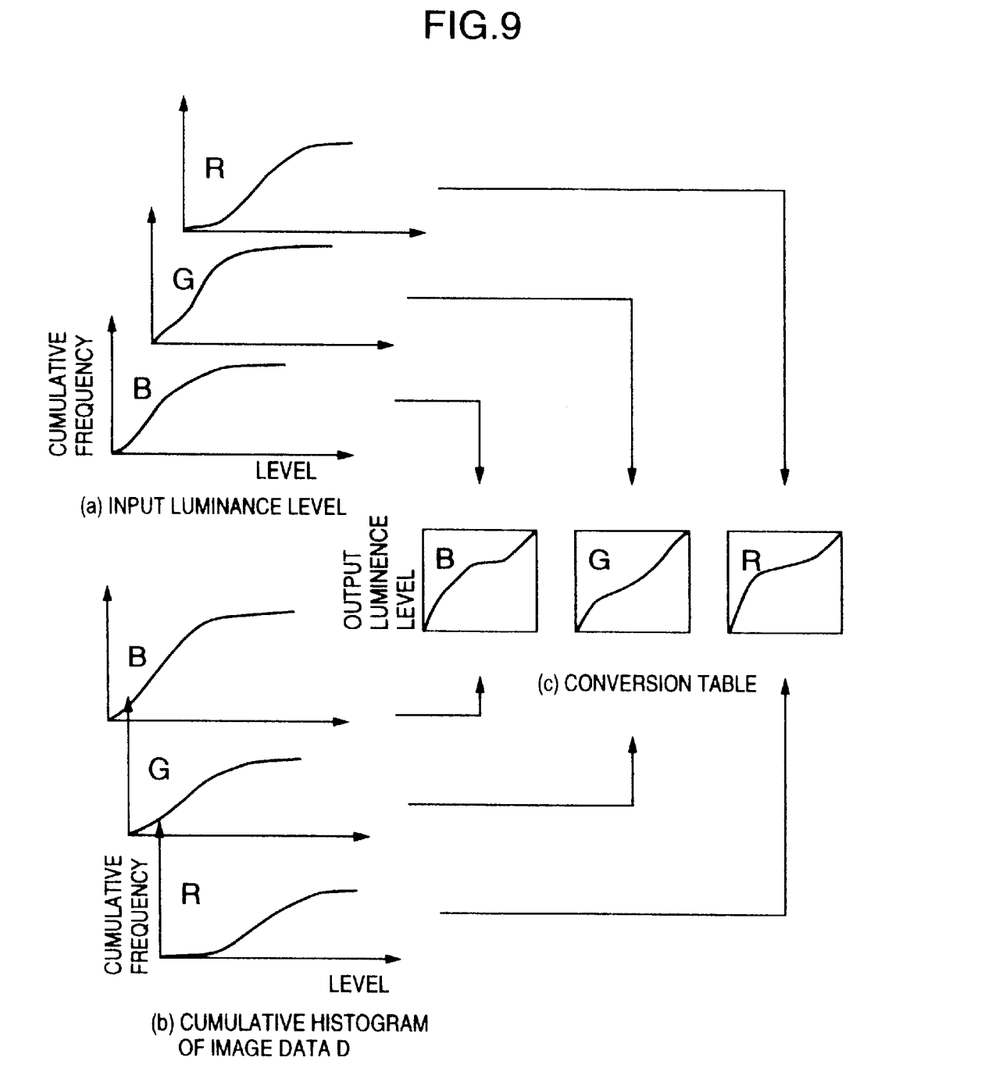
FIG. 9 is an explanatory view showing a conversion table.

The generation method of the conversion table for the image data R has thus been described as a typical example, and conversion tables for the three kinds of colors, i.e. R, G and B, are similarly generated by this method as shown in FIG. 9.

The reason why the image data of the second original are used when this second image is displayed is to eliminate deviation between shooting of the first original and that of the second original when a still image is shot or to eliminate adverse influences of deviation during scanning of the first original by the scanner, so as to obtain a stable still image during image display.

Besides the processing described above, processings such as profile hilighting of the image, color correction, removal of contamination and stains on the original, etc, can be carried out, whenever necessary, in color-morphing processing, too, in the same way as in the fore-mentioned wipe and desolve processings. Various processing softwares can be used for these processings in accordance with the intended applications.

The image data A (870) corresponding to the image A and the conversion tables 871, 8372 and 873 for R, G and B are subjected to compression processing and are recorded inside the opto-magnetic disk 850 as the data of the images subjected to the processing described above as shown in FIG. 10.

As a result of processing described above, the opto-magnetic disk 850 having the pre-processed image data recorded thereon is generated, and is loaded to the opto-magnetic disk device 300 of the image display apparatus according to the present invention.

Next, the image processing unit as one of the principal constituent elements of the present invention will be explained with reference to FIGS. 1, 11, 12 and 13.

The overall operation of the image processing unit 500 encompassed by the dash line in FIG. 1 is controlled by the image processing program (separately prepared for the image display apparatus of the present invention) stored in the main memory 220 of the personal computer 200. The image processing unit 500 includes compression/extension means 510 connected to the system bus 150 and image memory read/write control means 520.

The operation of the compression/extension means 510 is controlled by the image processing program stored in the main memory 220 of the personal computer 200, and this means 510 has the function of extending the compressed image data recorded in the opto-magnetic disk and storing it in the image memory, and the compression function of recording the image data from the image memory to the opto-magnetic disk, on the contrary.

The extension function extends an original of 0.6 MB/original to 3 MB/original and the compression function is reverse, for example.

The compression/extension means 510 has a through-function which does not execute compression/extension so as to directly connect the system bus 150 and the image bus 550.

The image processing unit 500 is equipped with an image data exclusive bus (hereinafter referred to as the "image bus") separated from the system bus 150 and having a higher data transfer rate (about two to four times the transfer rate of the system bus 150, that is, 60 MB/s) than the data transfer rate of the system bus (e.g. 16 MB/s, 32 MB/s). The compression/extension means 510 and the image memory read/write control means 520 are connected to this image bus 550.

Three image memories 610, 620 and 630 each comprising a dual port type video RAM device are connected to the image bus 550. Each image memory 610, 620, 630 has a 12 MB capacity. In the case of a display of 1,280×1,024 dots/screen, for example, each image memory can store the image data for four screens by allotment of 3 bytes/dot. As to the image data for these four screens, the image memory can store quarters of the original as partial views and as partial enlarged data as shown in FIG. 10 or can store a thinly elongated original such as a scroll by dividing it into a plurality of segments.

Figure 11:
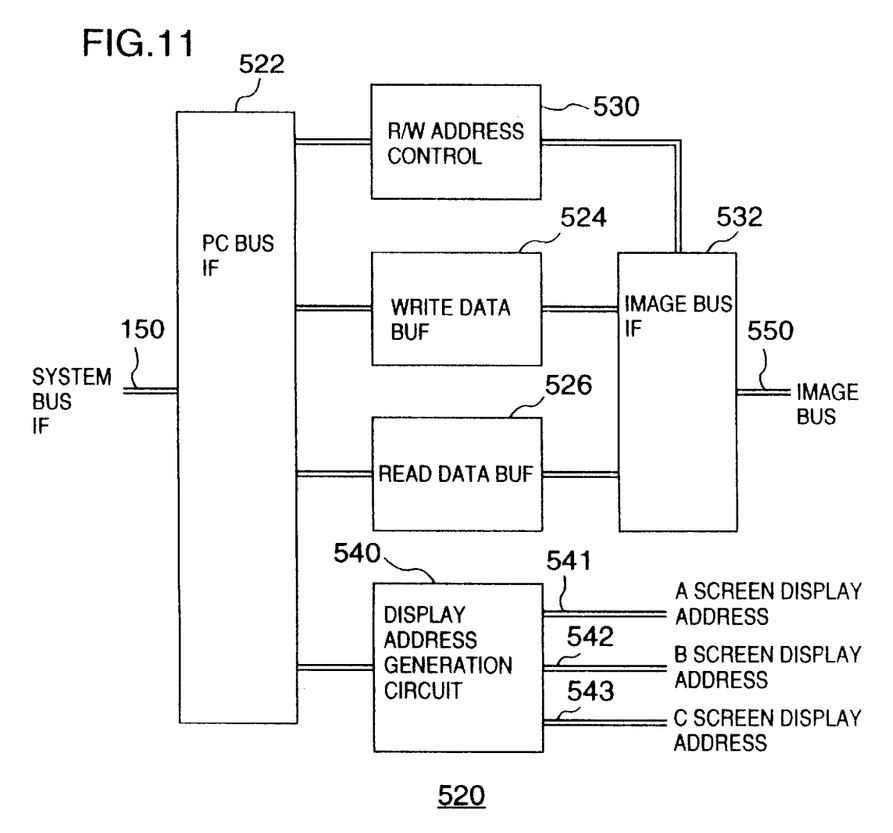
FIG. 11 is a circuit diagram of image memory read/write control means.

FIG. 11 is a block diagram showing a definite circuit construction of the image memory read/write control means 520.

The image memory read/write control means 520 includes a personal computer bus interface 522, a read/write address controller 530, a write data buffer 524, a read data buffer 526, an image bus interface 532 and a display address generation circuit 540.

The operation of this image memory read/write means 520 is controlled by the image processing program stored in the main memory 220 of the personal computer 200.

The personal computer bus interface 522 is connected to the system bus 150, and the data of the main memory 220 is outputted to the image bus 550 and is stored in the image memories 610, 620, 630 in accordance with the image processing program through the write data buffer 524 and the image bus interface 532.

The image data read out from the image memories 610, 620, 63 are inputted to the image bus 550 and the image bus interface 532, and are sent to the personal computer bus interface 522 through the read data buffer 526. This read data is stored in the main memory 220.

On the other hand, the read/write address controller 530 has the function of continuously generating the read/write addresses to predetermined regions of the image memories 610, 620, 630. Further, the read/write address controller 530 has the address conversion function for utilizing the main memory 220 of the personal computer system 100 as an extended memory.

When the image memories 610, 620, 630 are used as the extended memories, the data at the time of write are sent to the image memories 610, 620, 630 from the CPU 210 through the system bus 150, the image memory read/write control means 520 and the image bus 550. The data at the time of read are sent to the CPU 210 through the opposite route.

This utilization as the extended memories makes it possible to effectively utilize the memory areas of the image memories having the 36 MB capacity as a whole, which do not store the image data. Therefore, the utilization ratio of the image memories can be improved, and utilization efficiency of the image display apparatus can be improved as a whole.

The display address generation Circuit 540 has the function of generating the continuous addresses for display by reading out the image data of the pre-determined square regions for the image data stored in the image memories 610, 620, 630. Therefore, display bridging over a plurality of regions of the screen can be made depending on designation of the square regions, and an arbitrary region of the original can be displayed on a window or a scroll. Incidentally, the display addresses are supplied to the image memories 610, 620, 630 through the signal lines 541, 542, 543.

Figure 12:
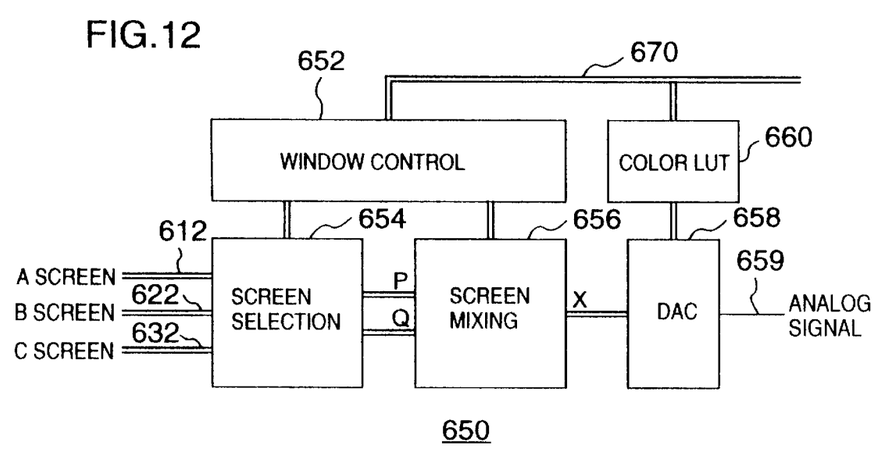
FIG. 12 is a circuit diagram of video processing means.

FIG. 12 is a block diagram showing a definite circuit construction of video processing means 650.

The video processing means 650 includes a window control circuit 652, a screen selection circuit 654, a screen mixing circuit 656, a D/A convertor 658 and a color look-up table (LUT) 660.

Figure 13:
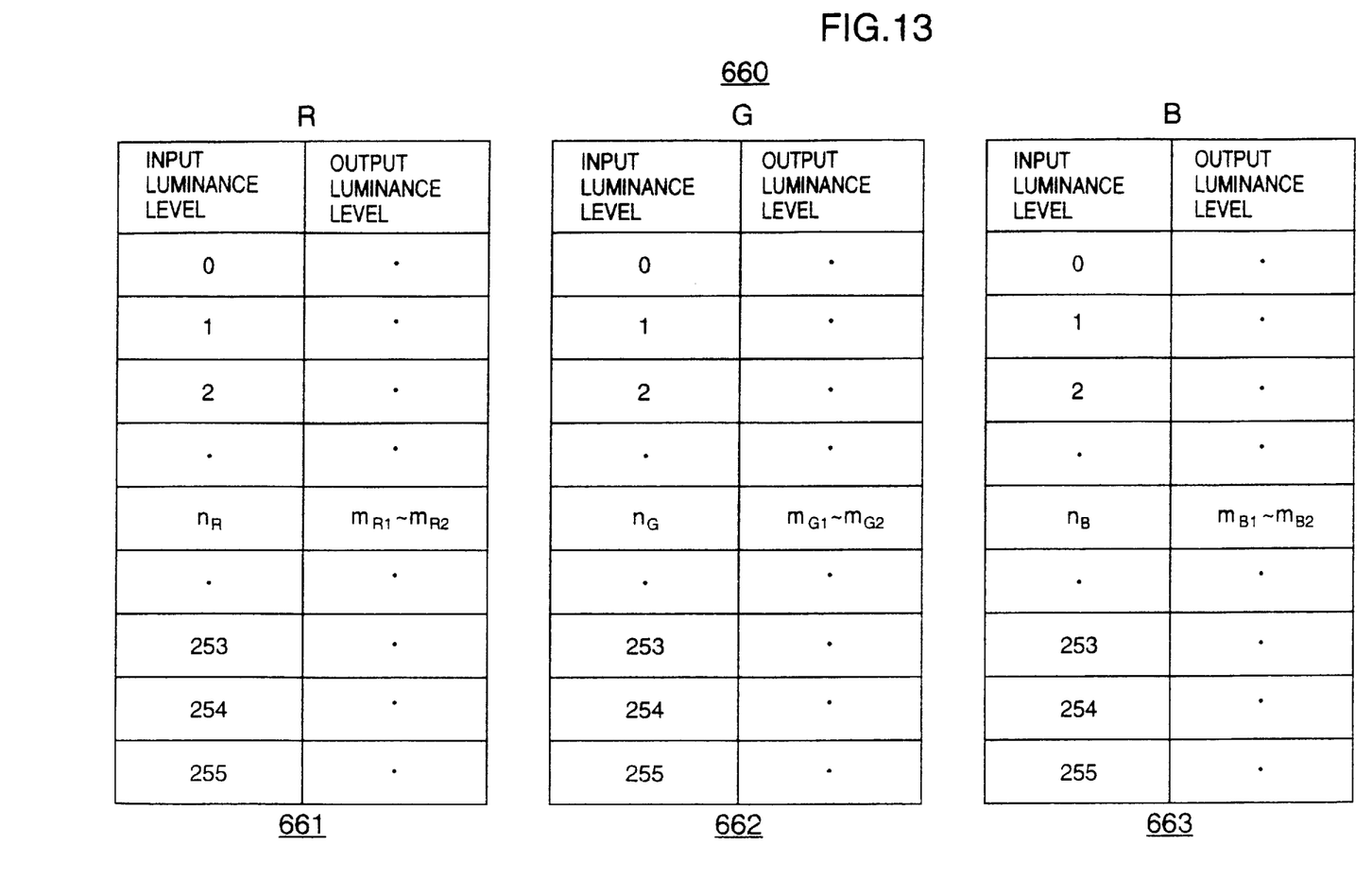
FIG. 13 is an explanatory view of a lookup table (LUT)

As shown in FIG. 13, the color look-up table (LUT) 660 includes three memories 661, 662, 663, which store data of output luminance levels $m_{R1}$ to $m_{R2}$, $m_{G1}$ to $m_{G2}$, $m_{B1}$ to $m_{B2}$ corresponding to input luminance levels $n_R$, $n_G$, $n_B$, for R, G and B, respectively.

As will be described later, a color-morphing processing for changing the color tone of the still image can be executed by changing the output luminance levels of these memories 661, 662, 663 in such a manner as to correspond to the passage of time.

The operation of this video processing means 650 is controlled by the image processing program stored in the main memory 220 inside the personal computer 200.

The image data in the image memories 610, 620, 630 are transferred to the screen selection circuit 654 through exclusive signal lines 612, 622, 632, respectively. The screen selection circuit 654 selects two screens from three screens and transfers them as image data P, Q to the screen mixing circuit 656. In this instance, the window control circuit 652 designates the display regions of the screen by the control data 670 generated by the image processing program of the personal computer 200 and sent through the system bus 150, the image memory read/write control means 520 and the image bus 550. As the window control circuit 652 designates the display regions, a wipe function of continuously switching the screens and a desolve function can be accomplished.

The image memory 610 is connected to the video processing means 650 through an exclusive signal line 612, and the image memory 620 is connected to the video processing means 650 through an exclusive signal line 622. Similarly, the image memory 630 is connected to the video processing means 650 through an exclusive signal line 632. Each of these signal lines 612, 622, 632 has a transfer rate of 480 MB/s which is eight times the transfer rate of the image bus 550, and can transfer the data of each image memory 610, 620, 630 to the video processing means 650 in parallel with the access from the side of the image bus 550.

The video processing means 650 converts the digital data of the image sent from each image memory to the analog data and displays them on the large screen display 700.

The explanation given above represents the case where the image software is prepared in advance by a separate system.

Next, the process for generating the image data by utilizing the scanner 330 of FIG. 1 provided to this image display apparatus will be explained.

The scanner 330 inputs the original supplied thereto and stores it in the image memories 610 to 630 through the compression/extension means 510. In this process, the compression/extension means 510 allows the image data to pass through but does not execute compression/extension of the data. The image data so inputted is confirmed on the large screen display 700, is then compressed by the compression/extension means 510 and is thereafter stored in the opto-magnetic disk provided to the opto-magnetic disk device 300 through the system bus 150. The operation described above is controlled by the image processing program stored in the main memory 220 inside the personal computer 200. Incidentally, processing for removing scratches, stains, contamination, etc, can be executed, whenever necessary, by the image processing program on the basis of the image data from the image memories, and furthermore, the software compression function of the image processing program can be used without using the compression function of the compression/extension means 510. In this case, the image data from the image memories are allowed to pass through the compression/extension means 510 and are sent to the personal computer 200 through the system bus 150. After being processed by the personal computer 200, the image data are sent to the opto-magnetic disk device 300 through the system bus 150. The image data recorded in this way have the same data content as the data content of the image file shown in FIG. 10.

Next, the mode of usage of color-morphing and its processing method when it is effected in the image display apparatus of the present invention will be explained.

When the image processing program is loaded to the personal computer 200, an initial screen is displayed on the graphic display 240. Then, resolution of the large screen display 700 (e.g. 1,280×1,024 dots), whether or not the standard is the HVC standard, the automatic mode, the interactive mode, and so forth, are designated.

When the automatic mode is designated on the initial screen, the menu display data 866 shown in FIG. 10 is read out from the opto-magnetic disk mounted to the opto-magnetic disk device 300 and the menu is displayed on the large screen display 700.

An instruction is sent from a remote control unit, not shown, to the IR reception unit 270 in accordance with this menu, and a scenario of the mountain containing the image data A (870) shown in FIG. 2 is selected, for example. As a result of this selection, the scenario data 875 is read out from the opto-magnetic disk, and the image data A (870) corresponding to the scenario data is stored in the memory designated by the scenario data among the image memories 610, 620, 630.

In this case, the scenario data 875 is sent from the opto-magnetic disk device 300 to the main memory 220 through the SCSI 310 and then through the system bus 150, and the content of the scenario is sequentially executed by the CPU 210.

This image data A (870) is displayed as the image A on the large screen display 700 from the image memory storing the image data through the screen selection circuit 654, the screen mixing circuit 656 and the DAC 658 of the video processing means 650.

Then, three kinds of conversion tables 871, 872, 873 corresponding to the image data A (870) are read into the main memory 220 of the personal computer system 200. The CPU 210 calculates the data of the luminance levels to be outputted on the basis of the conversion tables 871, 872, 873 at a rate corresponding to the time designated by the scenario data 875, sends the data to each memory 661, 662, 663 of the color look-up table (LUT) 660 so as to re-write the memory content, and changes the color tone of the display image from the time $t_1$ to the time $t_2$.

In the case described above, the window control circuit 652 controls the screen selection circuit 654 and the screen mixing circuit 656 by the control data 670 sent through the image bus 550 so that the read data of the image memory (e.g. 610) storing the image data A (870) can be supplied to the D/A convertor 658.

The write operation from the CPU to the LUT and the flow of the image data will be explained in detail with reference to FIGS. 13 and 14A to 14C. The process for color-morphing of R will be explained as a typical example with reference to FIG. 14A.

Figure 14A:
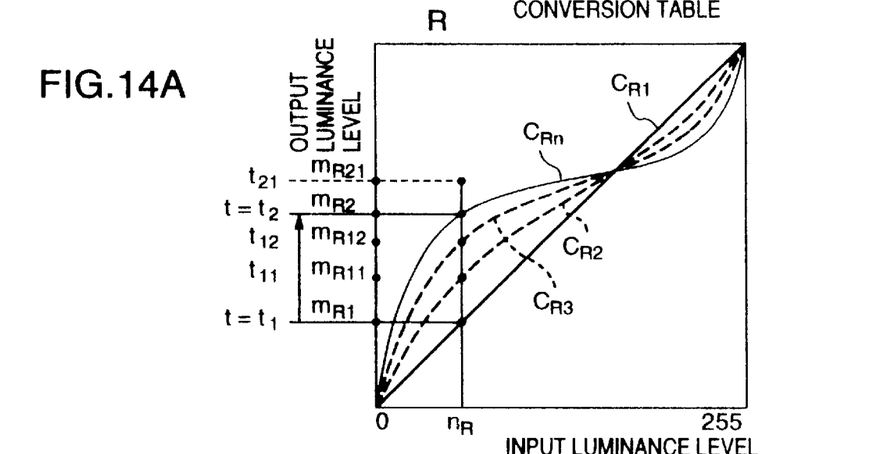
FIGS. 14A, 14B and 14C are explanatory views showing color-morphing execution steps in R, G and B, respectively.

(1) Time $t_1$ (Initial State)

The output luminance level is equal to the input luminance level and describes a straight line of 45° C., i.e. $C_{R1}$. Therefore, the CPU 210 writes a value equal to the input luminance level to the output luminance level of each memory 661, 662, 663 of the LUT 660. The image data A (870) are sent to the memories 661, 662, 663 of the LUT 660 by the video processing means 650, but the level is not changed because the output luminance level is equal to the input luminance level. In FIG. 14A, since the input luminance level $n_R$ is equal to the output luminance level $m_{R1}$, the image A of FIG. 2 is displayed on the large screen display 700.

(2) Time $t_{11}$

The CPU writes a value $m_{R11}$ between the initial state value, that is, $m_{R1}$, and the output luminance level $m_{R2}$ by the curve $C_{Rn}$ as the output luminance level at an intermediate time from the time $t_{11}$ to the time $t_{12}$. The value $m_{R11}$ can be determined, for example, in accordance with the following formula by making the change quantity of the value proportional to the time elapsed:

$$m_{R11}=m_{R1}+(m_{R2}-m_{R1})\times(t_{11}-t_1)/(t_2-t_1)$$

The image data A (870) is sent by the video processing means 650 to the LUT 660 and its level is converted. In other words, in FIG. 14A, the input luminance level $n_R$ is converted to the output luminance level $m_{R11}$. Since $m_{R11}$ exists between the curve $C_{R1}$ and the curve $C_{R3}$, the image B changed from the image A after the passage of time is displayed on the large screen display 700.

(3) Time $t_{12}$

Similarly, the CPU writes a value $m_{R12}$ between $m_{R1}$ and the output luminance level $m_{R2}$ by the curve $C_{Rn}$ as the output luminance level to the LUT 660 at the intermediate time from the time $t_{11}$ to the time $t_{12}$. The value $m_{R12}$ can be determined, for example, in accordance with the following formula by making the change quantity of the value proportional to the time elapsed:

$$m_{R12}=m_{R1}+(m_{R2}-m_{R1})\times(t_{12}-t_1)/(t_2-t_1)$$

In FIG. 14A, the input luminance level $n_R$ is converted to the output luminance level $m_{R12}$. Since $m_{R12}$ exists between the curve $C_{R2}$ and $C_{Rn}$, the image C changing from the image B shown in FIG. 12 after the passage of the time is displayed on the large screen display 700.

(4) Time $t_2$

The CPU writes the value of the output luminance level by the curve $C_{Rn}$ as the output luminance level to the LUT 660. In FIG. 14A, the input luminance level $n_R$ is converted to the output luminance level $m_{R2}$. Since $m_{R2}$ is the value existing on the curve $C_{Rn}$, the image D shown in FIG. 2 is displayed on the large screen display 700.

Besides the method described above, various patterns can be employed for changing the straight line $C_{R1}$ to the curve $C_{Rn}$.

In the explanation given above, the LUT is not changed after the time $t_2$, but the change beyond the change of the color tone in the original image can be imparted by giving the similar changes to the LUT 660 at the time $t_{21}$ after the time $t_2$. In this case, the output luminance level $m_{R2l}$ of the LUT 661 at the time $t_2$ can be determined in accordance with the following formula:

$$m_{R21}=m_{R1}+(m_{R2}-m_{R1})\times(t_{21}-t_1)/(t_2-t_1)$$

Figures 14B, 14C:
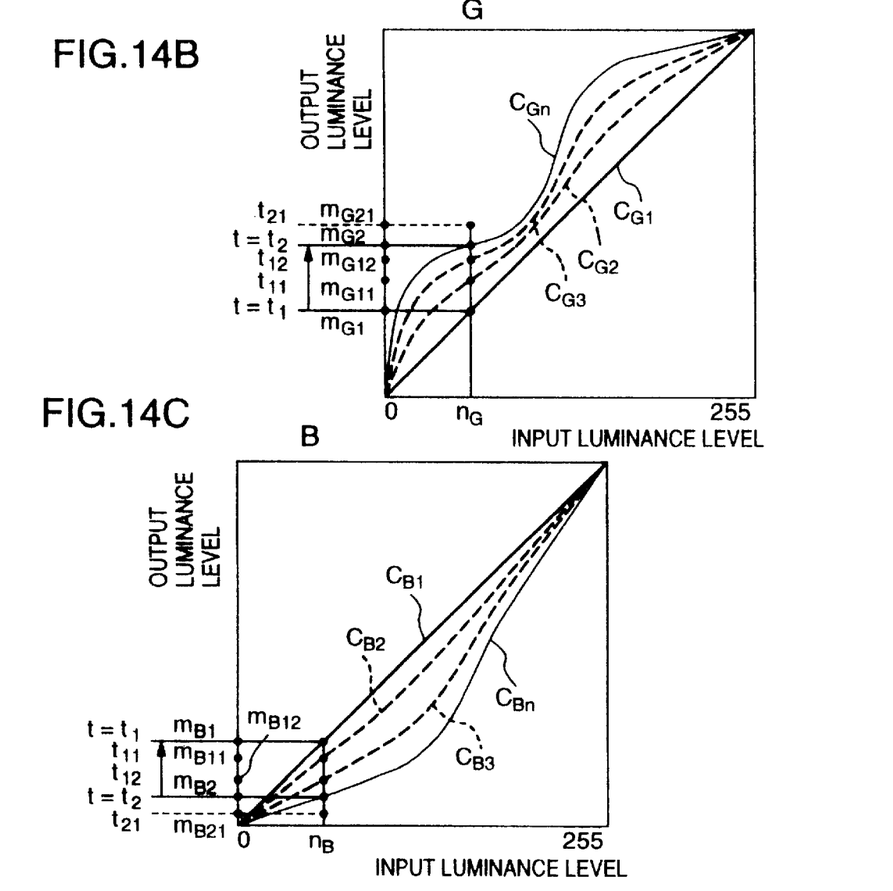

Similarly, FIGS. 14B and 14C show the processes for executing color-morphing for G and B, respectively.

On the other hand, the sound data corresponding to the image data described above are read out from the CD-ROM (not shown) set to the CD-ROM device 360 simultaneously with the selection of the scenario, and the sound is outputted from the speaker, not shown, through the amplifier, not shown. One scenario has a plurality of image data and can sequentially switch and display the screens.

The scenario data 875 described above are stored with the image data 861 to 865 and 870 in the opto-magnetic disk when the image file E 860 is generated, as shown in FIG. 10.

Incidentally, when the ordinary application program is loaded to the personal computer 200 without loading the image processing program, the image display apparatus described above naturally operates as the ordinary personal computer, and all the image memories can be utilized as the extended memories of the main memory 220.

As described above, the present invention can efficiently generate the image file for executing color-morphing of high precision still images on the display. Therefore, the present invention can reduce the working cost for the preparation of presentation, and can improve the presentation effect.

Further, the present invention can quickly display the high quality full-color images while keeping good match with the functions of the image display apparatus enabling high speed processing.

We claim:

1. A method of generating an image file comprising:

a first step of preparing a first original corresponding to an initial state of an image to be displayed and a second original corresponding to the final state of said image to be displayed;

a second step of generating first image data by reading said first original by a scanner;

a third step of analyzing said first image data for each of red (R), green (G) and blue (B), and generating a first histogram representing the relation between a luminance level and appearance frequency of each luminance level;

a fourth step of generating a first cumulative histogram by integrating the appearance frequency of said first histogram;

a fifth step of reading said second original by a scanner and generating second image data;

a sixth step of analyzing said second image data for each of R, G and B and generating a second histogram representing the relation between a luminance level and appearance frequency of each luminance level;

a seventh step of integrating the appearance frequency of said second histogram and generating a second histogram;

an eighth step of generating compressed image data from said first image data; and a ninth step of generating conversion tables for obtaining said second histogram on the basis of said first histogram;

wherein the image data generated by said eighth step and said conversion tables obtained by said ninth step are stored in an image file.

2. A method of generating an image file according to claim 1, wherein said conversion tables are those tables which determine a luminance level n1 corresponding to a cumulative frequency $\underline{a}$ in said first cumulative histogram and a luminance level n2 corresponding to the cumulative frequency $\underline{a}$ in said second cumulative histogram, and establish the relationship between said luminance level n2 and said luminance level n1.

* * * * *